United States Patent
Lee et al.

(10) Patent No.: US 7,447,129 B2
(45) Date of Patent: *Nov. 4, 2008

(54) METHOD OF RECORDING ERASE PATTERN INFORMATION ON AN OPTICAL RECORDING MEDIUM, ERASING INFORMATION ON THE OPTICAL RECORDING MEDIUM BASED ON THE ERASE PATTERN INFORMATION, AND OPTICAL RECORDING MEDIUM THEREFOR.

(75) Inventors: Kyung-geun Lee, Seongnam-si (KR); Yong-jin Ahn, Seoul (KR); In-sik Park, Suwon-si (KR); Seong-sue Kim, Seoul (KR); Du-seop Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

This patent is subject to a terminal disclaimer.

(21) Appl. No.: 11/414,328

(22) Filed: May 1, 2006

(65) Prior Publication Data

US 2006/0193227 A1    Aug. 31, 2006

Related U.S. Application Data

(63) Continuation of application No. 10/320,737, filed on Dec. 17, 2002, now Pat. No. 7,369,470.

(60) Provisional application No. 60/390,119, filed on Jun. 21, 2002.

(30) Foreign Application Priority Data

May 20, 2002   (KR) ................. 2002-27928

(51) Int. Cl.
G11B 7/00    (2006.01)

(52) U.S. Cl. ................. 369/47.51; 369/59.11; 369/116; 369/53.26

(58) Field of Classification Search ...................... None
See application file for complete search history.

(56) References Cited

U.S. PATENT DOCUMENTS 5,291,470 A    3/1994    Nishiuchi et al.

(Continued)

FOREIGN PATENT DOCUMENTS

EP    0 405 610 A2    1/1991

(Continued)

OTHER PUBLICATIONS

U.S. Appl. No. 10/320,737, filed Dec. 17, 2002, Kyung-geun Lee et al.
U.S. Appl. No. 10/992,700, filed Nov. 22, 2004, Kyung-geun Lee et al.

*Primary Examiner*—Wayne Young
*Assistant Examiner*—Lixi Chow
(74) *Attorney, Agent, or Firm*—Stein, McEwen & Bui, LLP

(57) ABSTRACT

An optical recording medium allowing data to be recorded on, erased from, and reproduced from, and storing information about power levels of an erase pulse. The recorded erase pattern information may include information about power levels of first and last pulses of an erase pattern for erasing data. The first and last pulses of the erase pattern can be differently set depending on the differing kind of recording layer or layers of a disk or differing kinds of disks and recorded in a reproducible only area or rewritable area of the optical recording medium. Thus, by presetting the appropriate erase power levels, the time required for selecting an optimal erase power for the optical recording medium can be considerably reduced.

12 Claims, 4 Drawing Sheets

U.S. PATENT DOCUMENTS

| | | | |
|---|---|---|---|
| 5,745,467 A | 4/1998 | Sakaue et al. | |
| 5,978,351 A * | 11/1999 | Spruit et al. | 369/275.3 |
| 6,160,784 A | 12/2000 | Maeda et al. | |
| 6,396,792 B1 * | 5/2002 | Ichihara | 369/116 |
| 6,791,926 B1 * | 9/2004 | Furumiya et al. | 369/53.13 |
| 6,822,937 B2 * | 11/2004 | Tsukagoshi et al. | 369/275.3 |
| 2002/0003762 A1 | 1/2002 | Dekker | |
| 2002/0067670 A1 * | 6/2002 | Akiyama et al. | 369/47.52 |
| 2002/0114233 A1 * | 8/2002 | Sasaki et al. | 369/47.51 |
| 2002/0114235 A1 * | 8/2002 | Stek et al. | 369/47.53 |

FOREIGN PATENT DOCUMENTS

| | | |
|---|---|---|
| EP | 469727 A1 | 2/1992 |
| EP | 1 168 315 A2 | 1/2002 |
| JP | 05-072681 | 3/1993 |
| JP | 08-050721 | 2/1996 |
| JP | 10-064064 | 3/1998 |
| JP | 2000-123367 | 4/2000 |
| JP | 2000-137916 | 5/2000 |
| TW | 190938 | 9/1992 |
| TW | 419657 | 1/2001 |
| TW | 1253063 | 4/2006 |

* cited by examiner

FIG. 4

| BYTE NUMBER | CONTENTS | # OF BYTES |
|---|---|---|
| 0 ~ N-1 | | - |
| N | POWER LEVELS OF THE START AND LAST PULSES IN ERASE PULSE TRAIN | 1 |
| N+1 to M | | - |

FIG. 5

| BYTE NUMBER | CONTENTS | # OF BYTES |
|---|---|---|
| 0 ~ N-1 | ... | - |
| N | POWER LEVELS OF THE START AND LAST PULSES IN ERASE PULSE TRAIN FOR L0 | 1 |
| N+1 | POWER LEVELS OF THE START AND LAST PULSES IN ERASE PULSE TRAIN FOR L1 | 1 |
| ... | | |

METHOD OF RECORDING ERASE PATTERN INFORMATION ON AN OPTICAL RECORDING MEDIUM, ERASING INFORMATION ON THE OPTICAL RECORDING MEDIUM BASED ON THE ERASE PATTERN INFORMATION, AND OPTICAL RECORDING MEDIUM THEREFOR.

CROSS-REFERENCE TO RELATED APPLICATIONS

This application is a continuation application of U.S. Ser. No. 10/320,737, filed Dec. 17, 2002, now U.S. Pat. No. 7,369,470. This application also claims the benefit of Korean Application No. 2002-27928, filed May 20, 2002 in the Korean Intellectual Property Office and U.S. Provisional Application No. 60/390,119, filed on Jun. 21, 2002, the disclosures of which are incorporated herein by reference.

BACKGROUND OF THE INVENTION p 1. Field of the Invention

The present invention relates to an optical recording medium, and more particularly, to a method of recording erase pattern information on an optical recording medium, erasing information on the optical recording medium, and the optical recording medium on which power information of the erase pattern information is recorded.

2. Description of the Related Art

Recording data on an optical disk, a kind of optical recording media, means that a mark is made in a track formed on the optical disk. Currently recordable, erasable, and reproducible disks typically include RW-CDs of 650 MB, DVDs-RAM/R/RW of 4.7 GB, DVDs+RW of 4.7 GB, HD-DVDs of 23 GB, which are still under development, and the like. In a rewritable disk, a recording layer may be coated with a phase change layer which is caused to change from a crystalline to amorphous state according to an applied temperature or power level, with a mark being formed (according to the data required) through a phase change of the phase change layer. In such a rewritable disk, a writing strategy, according to the types of recording media, is adopted to optimize recording/reproducing characteristics. However, since recording conditions may vary from drive to drive, an optical recording medium compatible with one drive may not be compatible with another drive. Conventionally, a drive may include a pick-up and control apparatus, with the control apparatus controlling the operation of the pickup to perform any recording, erasing, or reproducing operations.

SUMMARY OF THE INVENTION

To solve the above-described and other problems, it is an aspect of the present invention to provide a method of recording erase pattern information, a method of erasing information based on recorded erase pattern information, and an optical recording medium storing information about power levels of first and last pulses of the erase pattern, such that a laser optimal power level necessary for erasing data is capable of being easily and quickly detected so the optical recording medium can be used with any type of drive.

Additional objects and advantages of the invention will be set forth in part in the description which follows and, in part, will be obvious from the description, or may be learned by practice of the invention.

To achieve the above and other aspects, an embodiment of the present invention may provide a method for recording erase pattern information on an optical recording medium, with the erase pattern information including information about power levels of first and last pulses of an erase pattern for erasing data.

To further achieve the above and other aspects, an embodiment of the present invention may provide a method for erasing information from an optical recording medium based on erase pattern information recorded on the optical recording medium, with the erase pattern information including information about power levels of first and last pulses of an erase pattern for erasing data.

To achieve the above and still other aspects, an embodiment of the present invention may provide an optical recording medium which allows data to be recorded on, erased from, and reproduced therefrom. Erase pattern information, including information about power levels of first and last pulses of an erase pattern for erasing data, can be recorded in the optical recording medium.

BRIEF DESCRIPTION OF THE DRAWINGS

These and other aspects and advantages of the invention will become apparent and more readily appreciated from the following description of the preferred embodiments, taken in conjunction with the accompanying drawings of which:

FIG. 4 illustrates an example of data recorded in a pre-recorded area, such as that shown in FIG. 1; and FIG. 5 illustrates an example of data recorded in a pre-recorded area, such as that shown in FIG. 1, when the optical recording medium is a dual layer optical recording medium.

DETAILED DESCRIPTION OF THE PREFERRED EMBODIMENTS

Figure 1:
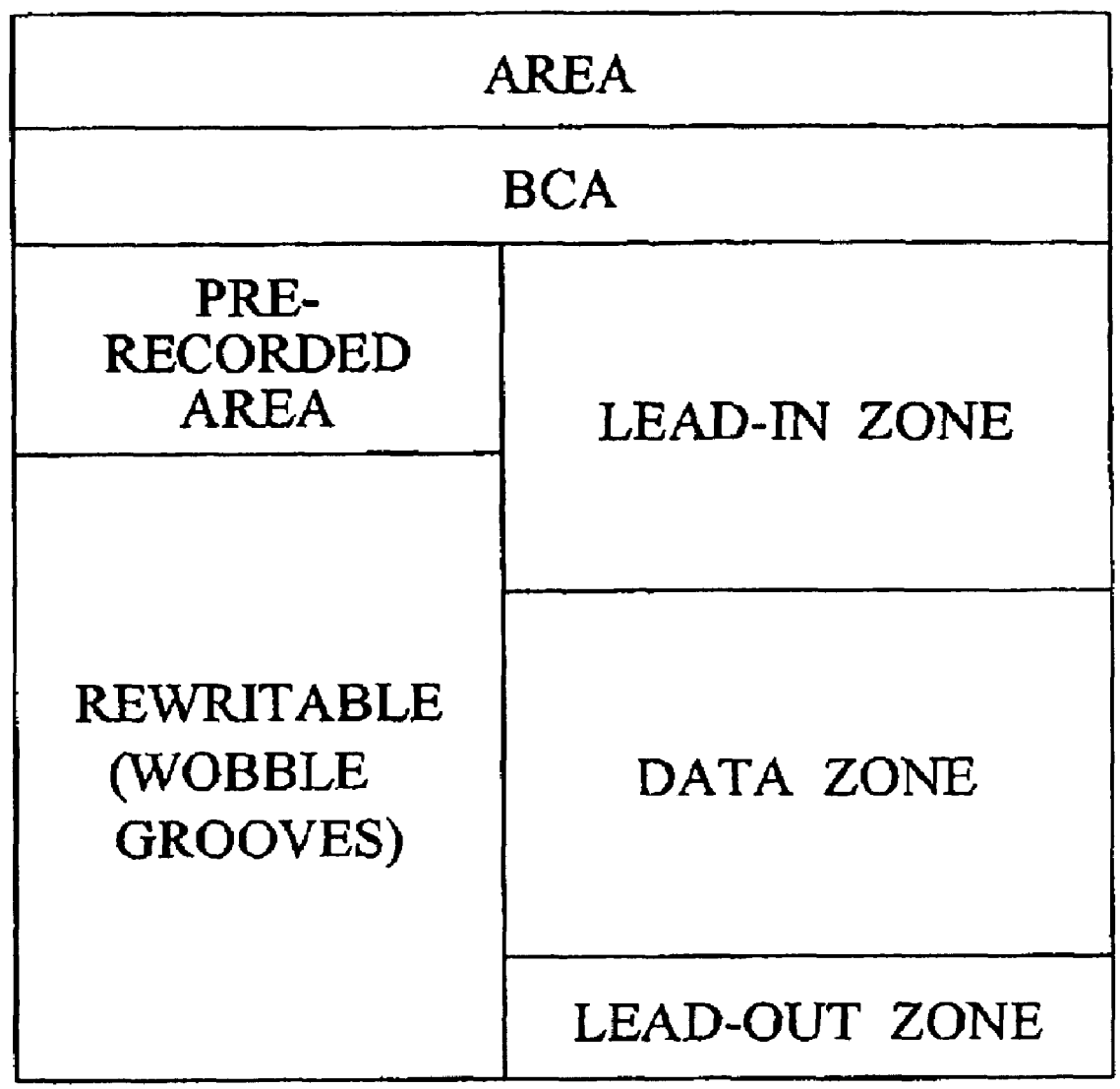
FIG. 1 is an illustration showing different areas of an optical recording medium, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is an illustration showing areas of an optical recording medium including a burst cutting area (BCA), a pre-recorded area, and a rewritable area. Referring to FIG. 1, in the BCA, information specific to the disk, such as a disk number or the like, is recorded in a barcode type in a radial direction. In the pre-recorded area, data that is only reproducible is recorded as reproducible only high frequency wobbles or pits. Data recorded in the pre-recorded area includes data types, disk sizes, channel bit lengths, disk structures, time required for forming recording and erase patterns, recording powers, and the like. In the optical recording medium according to an embodiment the present invention, erase pattern information about power levels of first and last pulses of an erase pattern for erasing data is recorded in the reproducible only pre-recorded area or the rewritable area in/from which data is rewritten/reproduced. Hereinafter, for convenience, embodiments of the present invention will only be described with the erase pattern information being stored in the pre-recorded area, noting that the present invention is not limited thereto.

A combination of power levels of first and last pulses of an erase pattern for erasing data recorded in an optical disk can be classified into four types according to different kinds of recording layers of disks or different kinds of disks, as illustrated in FIGS. 2B-2E.

Figures 2A, 2B, 2C, 2D, 2E:
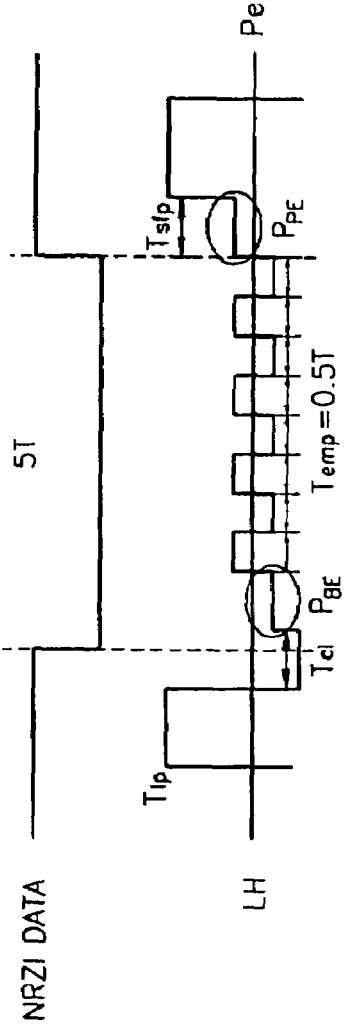
FIGS. 2A through 2E are illustrations showing waveforms of data and four types of erase patterns.

Referring to FIGS. 2A-2E, an erase pattern can be classified into four types: (a) LH; (b) HH; (c) HL; and (d) LL. The primary difference between each erase pattern is marked with a circle for easy identification. FIG. 2A illustrates NRZI Data. In FIG. 2B, erase pattern LH includes a power level of a first pulse being equal to a low level $P_{BE}$ of subsequent erase multi-pulses, with the erase multi-pulses ending at the low level $P_{BE}$, and with the power level of a last pulse, at Tsfp, being equal to a high level $P_{PE}$ of the erase pattern. In FIG. 2C, erase pattern HH includes a power level of a first pulse being equal to a high level $P_{PE}$ of subsequent erase multi-pulses, with the multi-pulses ending at the high level $P_{PE}$, and with the level of a last pulse, at Tsfp, being maintained at the high level $P_{PE}$ of the erase pattern. In FIG. 2D, erase pattern HL includes a power level of a first pulse being equal to a high level $P_{PE}$ of subsequent erase multi-pulses, with the erase multi-pulses ending at the high level $P_{PE}$, and with the level of a last pulse, at Tsfp, being equal to a low level $P_{BE}$ of the erase pattern. Finally, in FIG. 2E, erase pattern LL includes a power level of a first pulse being equal to a low level $P_{BE}$ of subsequent erase multi-pulses, with the erase multi-pulse ending at the low level $P_{BE}$, and with a level of a last pulse, at Tsfp, being maintained at the low level $P_{BE}$ of the erase pattern.

When the first and last pulses of an erase pattern can be differently set depending on differing kinds of recording layers of disks, differing kinds of disks, or even differing kinds of layers of a multi-layered disk, and recorded in a reproducible only area, of an optical recording medium, a recording apparatus recording onto the optical recording medium does not need to perform additional tests to select an optimal erase power. Thus, by eliminating this conventionally required operation to select an optimal erase power, the time required for determining an erase power level can be considerably reduced.

Figures 3A, 3B:
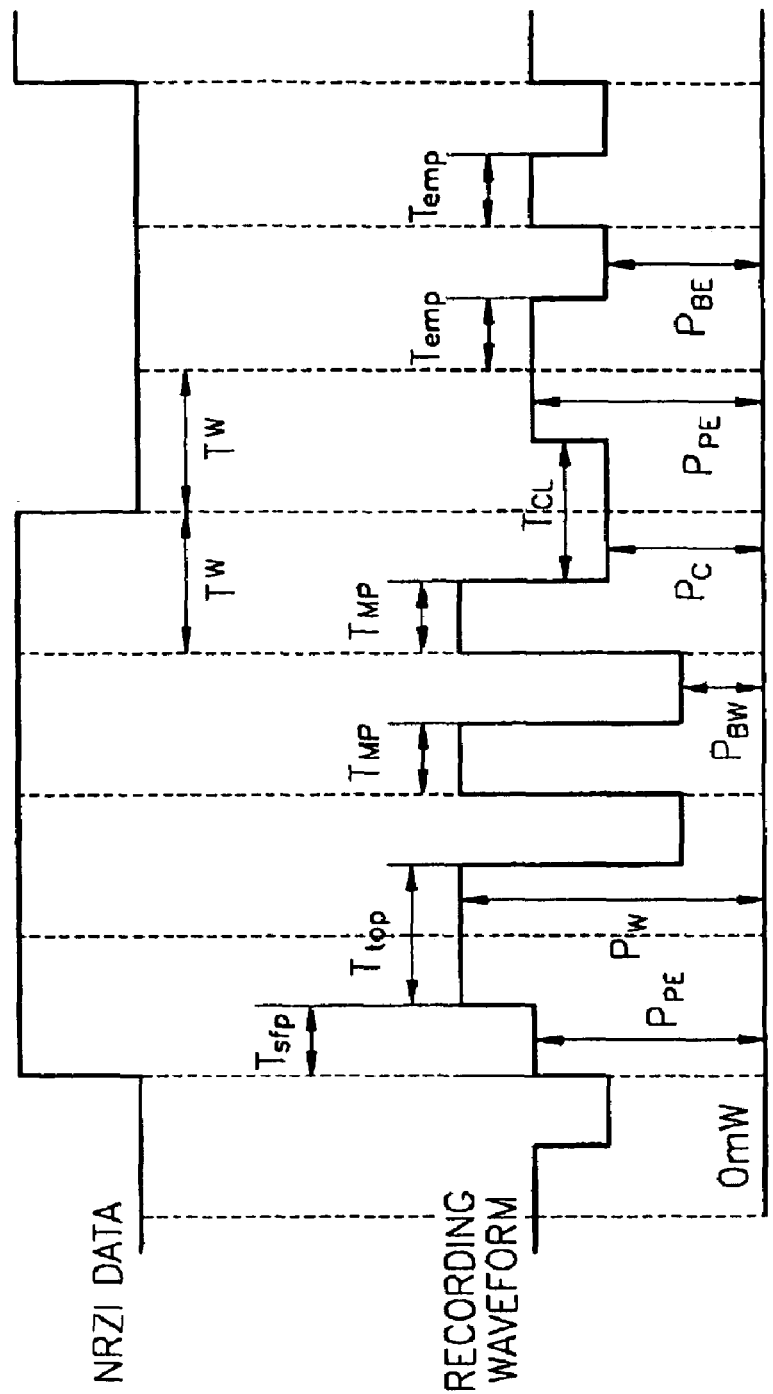
FIGS. 3A and 3B illustrate an example of a recording waveform for recording data in a data zone of an optical recording medium, such as that shown in FIG. 1.

FIGS. 3A and 3B illustrate an example of a recording waveform for recording data in a data zone of an optical recording medium, such as the optical recording medium shown in FIG. 1. In FIGS. 3A and 3B, horizontal quantities represent times of recording and erasing patterns while vertical quantities represent recording powers.

FIG. 4 illustrates an example of data recorded in a pre-recorded area, such as the prerecorded region shown in FIG. 1. Referring to FIG. 4, in the pre-recorded area, besides the times required for forming recording and erase patterns of the waveform shown in FIG. 3A, recording power, kinds of disks, sizes of disks, and the like can be recorded. In addition, the pre-recorded area includes reserved bytes that are not assigned for recording. Information about power levels of first and last pulses of the erase pattern can also be recorded in one of these reserved bytes. In FIG. 4, byte number (BN) N may be assigned for recording information about the power levels of the first and last pulses of the erase pattern. In detail, the power level of the first pulse of the erase pattern can be defined as being high using 4 bits, and the power level of the last pulse can be defined as being low using 4 bits. The low level $P_{BE}$ of an erase pattern can be defined as "0001" and the high level $P_{PE}$ of the erase pattern can be defined as "0000," in the case of the erase pattern shown in FIG. 3B, such that "00010000" is recorded in BN N. A recording apparatus may then read "00010000" recorded in BN N of the optical disk, and thereby identify appropriate power levels of the first pulse of the erase pattern, i.e., $P_{BE}$, and the last pulse, i.e., $P_{PE}$, without additional test operations to determine the same. In FIG. 4, M represents a last byte in an area storing disk information.

FIG. 5 illustrates another example of data recorded in the pre-recorded area, such as the prerecorded area shown in FIG. 1 when the optical disk is a dual layer optical recording medium. Referring to FIG. 5, BN N can be assigned for recording erase pattern information about power levels of first and last pulses of an erase pattern for a first recording layer L0. BN N+1 can be assigned for recording erase pattern information about power levels of first and last pulses of an erase pattern for a second recording layer L1. The respective power levels of the first pulses of the erase patterns can be defined as being high using 4 bits of each of BN N and N+1, and the respective power levels of the last pulses can be defined as being low using 4 bits of each of BN N and N+1.

In FIG. 5, even though erase pattern information of two recording layers are recorded in one recording layer, erase pattern information corresponding to each recording layer can be recorded in each of the two recording layers.

As described above, embodiments of the present invention set forth optical disks recording power levels of first and last pulses of an erase pattern, with the power levels being differently set depending on the differing kind or kinds of recording layer or layers of the disk or differing kinds of disks, and recorded in a reproducible only area or rewritable area of the optical recording medium. Thus, by presetting the appropriate erase power levels, the time required for selecting an optimal erase power for the optical recording medium can be considerably reduced.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for recording erase pattern information on an optical recording medium, with the optical recording medium allowing data to be recorded and/or reproduced thereon and/or therefrom, the method comprising:
   recording data on the optical recording medium; and
   recording erase pattern information for use to select an optimum erase power for erasing data on the optical recording medium, the erase pattern information including information regarding a power level of a first pulse of erase pulses and a power level of a period between an end of erase pulses and a start point of a first pulse of write pulses, and duration information regarding a duration of the period between the end of the erase pulses and the start point of the first pulse of the write pulses.

2. The method of claim 1, wherein the erase pattern information is recorded in a reproducible only area of a recording layer of the optical recording medium.

3. The method of claim 1, wherein the erase pattern information is recorded in a recordable area of a recording layer of the optical recording medium.

4. The method of claim 1, wherein the power level of the first pulse of the erase pulses and the power level of the period between the end of the erase pulses and the start point of the first pulse of the write pulses are set differently, depending on different kinds of recording layers on optical recording media, different kinds of optical recording media used, and/or different kinds of recording layers on a multi-layered optical recording medium, and are used to avoid additional tests needed to select an optimum erase power for erasing data on the optical recording medium.

5. A method for recording erase pattern information on an optical recording medium, the optical recording medium having a plurality of recording layers and allowing data to be recorded thereon, erased therefrom, and reproduced therefrom, the method comprising:

recording data on the recording layers of the optical recording medium; and recording, on the optical recording medium, erase pattern information for use to select an optimum erase power for erasing data in the recording layers on the optical recording medium, the erase pattern information including information regarding a power level of a first pulse of an erase pattern and a power level of a period between a last pulse of the erase pattern and a start point of a first pulse of a write pattern, and duration information regarding a duration of the period between the last pulse of the erase pattern and the start point of the first pulse of the write pattern.

6. The method of claim 5, wherein the erase pattern information is recorded for each of the plurality of recording layers in a recording layer selected from the plurality of recording layers.

7. The method of claim 6, wherein the erase pattern information is recorded in a reproducible only area of the selected recording layer, or a recordable area of the selected recording layer.

8. The method of claim 5, wherein the power level of the first pulse of the erase pattern and the power level of the period between the last pulse of the erase pattern and the start point of the first pulse of the write pattern are set at different power levels, depending on different kinds of recording layers on optical recording media, different kinds of optical recording media used, and/or different kinds of recording layers on a multi-layered optical recording medium, and are used to avoid additional tests needed to select the optimum erase power for erasing data on the optical recording medium.

9. The method of claim 8, wherein the respective erase pattern information for each of the plurality of recording layers is recorded in a reproducible only area or a recordable area of each of the recording layers.

10. A method for erasing data from an optical recording medium, with the optical recording medium allowing data to be recorded thereon, erased therefrom, and reproduced therefrom, the method comprising:

reading, from the optical recording medium, erase pattern information for use to select an optimum erase power for erasing data on the optical recording medium, the erase pattern information including information regarding a power level of a first pulse of an erase pattern and a power level of a period between an end the erase pattern and a start point of a first pulse of a write pattern, and duration information regarding a duration of the period between the end of the erase pattern and the start point of the first pulse of the write pattern; and erasing data recorded on the optical recording medium, based on the erase pattern information.

11. The method of claim 10, wherein the erase pattern information is recorded in a reproducible only area or a recordable area of a recording layer of the optical recording medium.

12. The method of claim 10, wherein the power level of the first pulse of the erase pattern and the power level of the period between the end of the erase pattern and the start point of the first pulse of the write pattern are set at different power levels, depending on different kinds of recording layers on optical recording media, different kinds of optical recording media used, and/or different kinds of recording layers on a multi-layered optical recording medium, and are used to avoid additional tests needed to select the optimum erase power for erasing data on the optical recording medium.

* * * * *